(12) United States Patent
Portier

(10) Patent No.: US 8,800,809 B2
(45) Date of Patent: Aug. 12, 2014

(54) CANISTER FOR DESICCANTS AND OTHER MATERIAL

(75) Inventor: Benoit Portier, Mehun sur Yevre (FR)

(73) Assignee: Clariant Production (France) S.A.S., Choisy le Roi (FR)

( * ) Notice: Subject to any disclaimer, the term of this patent is extended or adjusted under 35 U.S.C. 154(b) by 251 days.

(21) Appl. No.: 12/682,666

(22) PCT Filed: Oct. 7, 2008

(86) PCT No.: PCT/EP2008/063387
§ 371 (c)(1),
(2), (4) Date: Jul. 20, 2010

(87) PCT Pub. No.: WO2009/047243
PCT Pub. Date: Apr. 16, 2009

(65) Prior Publication Data
US 2010/0282754 A1    Nov. 11, 2010

Related U.S. Application Data

(60) Provisional application No. 60/979,251, filed on Oct. 11, 2007.

(51) Int. Cl.
*B65D 41/18* (2006.01)
*B65D 43/10* (2006.01)
(52) U.S. Cl.
USPC ......... 220/784; 206/204; 220/367.1; 220/373
(58) Field of Classification Search
USPC ............... 206/204; 220/780, 367.1, 782–784, 220/789, 792, 204, 369–373; 96/108; 215/308

See application file for complete search history.

(56) References Cited

U.S. PATENT DOCUMENTS

| | | | | |
|---|---|---|---|---|
| 3,107,838 A | * | 10/1963 | Brys et al. | 229/5.5 |
| 3,223,278 A | | 12/1965 | Allen | |
| 3,999,677 A | * | 12/1976 | Oberkircher | 220/266 |
| 4,093,105 A | | 6/1978 | Russell et al. | |
| 4,385,706 A | * | 5/1983 | Freeman | 215/225 |
| 5,221,000 A | * | 6/1993 | Lee | 206/77.1 |
| 5,641,088 A | * | 6/1997 | Berger | 220/613 |
| 5,730,785 A | | 3/1998 | Idol et al. | |
| 5,759,241 A | | 6/1998 | Klett et al. | |

FOREIGN PATENT DOCUMENTS

WO        WO9633108 A1    10/1996

* cited by examiner

*Primary Examiner* — Mickey Yu
*Assistant Examiner* — Chun Cheung
(74) *Attorney, Agent, or Firm* — Scott R. Cox

(57) ABSTRACT

A canister including a body portion containing an end wall and a cylindrical wall extending from the end wall to an upper cylindrical edge portion thereof, and a cap, securable to the body portion, containing a circular top wall with an inner surface and an outer surface and a cylindrical outer wall secured to the top wall containing an inner portion and an outer portion, wherein one or more support elements are secured to the inner surface of the top wall, thereby forming two ends of the support element and also thereby forming a gap between the inner portion of the cylindrical outer wall of the cap and each end of the support element, whereby at least a portion of the upper cylindrical edge portion of cylindrical wall of the body portion is secured within the cap.

8 Claims, 7 Drawing Sheets

CANISTER FOR DESICCANTS AND OTHER MATERIAL

BACKGROUND OF INVENTION

One embodiment of this invention relates to canisters, particularly desiccant canisters. More particularly, one embodiment of this invention relates to a canister containing a cap which is secured upon a body portion of the canister, wherein because of the structure of the canister, there is a reduced risk of "cap pop-off" during manufacturing and use of the canister. The unique structure of the canister more securely affixes the cap to the body portion of the canister than occurs with prior art canisters.

A number of small desiccant canisters formed from gas and liquid impermeable body portions onto which are secured one or more perforated end caps have been disclosed. These canisters generally contain a desiccant material which absorbs moisture from the air as the air flows through the perforations in the end caps of the desiccant canister.

A common structure of these canisters is a one piece plastic body containing a cylindrical outer wall and a circular bottom wall, onto which is secured a cap containing a cylindrical outer wall and a circular top wall. In one embodiment the canister has a snap fit locking system contained in the outer wall of the body and the outer wall of the cap to assist in holding the cap onto the body. One such locking system is disclosed in U.S. Pat. No. 4,093,105, whereby a locking rib (22) in an upper portion of the cylindrical outer wall of the body portion snaps into a recess (32) in an upper cylindrical portion of the cap when the cap is secured onto the body.

Another similar method of securing a cap to a body of a desiccant canister utilizes a locking rib (26) of the body which interacts with a recess (36) in an outer wall of the cap to form a snap fit, as shown in U.S. Pat. No. 5,759,241.

An alternative structure for securing a cap to a body a canister is disclosed by U.S. Pat. No. 5,730,785, whereby the cap, comprising a cylindrical portion (27) with an annular bead (29), fits within a groove (30) of the body. In this structure a portion of the cap extends downward within the body of the canister. This structure contrasts with the structure that is disclosed by U.S. Pat. Nos. 4,093,105 and 5,759,241 wherein the cylindrical outer wall of the cap is secured over an upper portion of the outer wall of the body. To provide additional structural support for the ends of the canister of U.S. Pat. No. 5,730,785, these ends contain ribs (15 and 15'), as shown in FIGS. 3 and 4. These ribs extend from one outside edge of each cap to another outside edge of the cap.

Although canisters, particularly desiccant canisters, have been formulated using designs such as those disclosed hereinabove, problems often occur with the caps popping off of the body during manufacturing and assembly, particularly when horizontal pressure is placed on the body of the canister, or during use of the desiccant canister.

Therefore it is one object of an embodiment of the invention to provide an improved canister, particularly for use with desiccants.

It is another object of one embodiment of the invention to provide a canister which addresses the issue of cap pop-off that can occur during manufacturing and assembly of the canisters.

It is a further object of the invention to provide a design for canisters, particularly desiccant canisters, which contains a structure which is resistant to horizontal pressure placed on the sides of the body of the canister during manufacture or use.

These and other objects and features of one embodiment of the invention will become apparent to those skilled in the art from a consideration of the following detailed description, drawings and claims. However, the description, along with the accompanying drawings, provides only selected example of the construction of the product to illustrate one embodiment of the invention and does not place any imitations on the scope of the invention.

SUMMARY OF INVENTION

In accordance with the present invention there is provided a canister, particularly a desiccant canister, comprised of a body portion comprising an end wall and a cylindrical wall extending away from the end wall containing an upper cylindrical edge portion thereof, and a cap, securable to the body portion, comprising a circular top wall with an inner surface and an outer surface and a cylindrical outer wall, wherein one or more support elements are secured to the inner surface of the top wall of the cap which enhance the stability of the end wall, and extend from a first location near, but not touching, an inner portion of the cylindrical outer wall of the cap to a second location also near, but not touching, the inner portion of the outer wall of the cap, thereby resulting in at least two ends of the support element and also thereby creating gaps between the inner portion of the cylindrical outer wall of the cap and each end of the support element, whereby a portion of the upper cylindrical edge portion of the cylindrical wall of the body portion is secured within these gaps when the cap is secured onto the body portion of the canister.

In a further embodiment of the invention, the cylindrical outer wall of the cap further comprises a snap portion extending inwardly.

In a further embodiment of the invention, the upper cylindrical edge portion of the cylindrical wall of the body portion further comprises a groove which cooperates with the snap portion of the cap, wherein when said cap is secured to the body portion, there is an interaction of the snap portion with the groove resulting in the cap being securely held onto the body portion of the canister.

In a further embodiment a label is secured to the cylindrical wall of the body portion, wherein said label preferably covers at least a portion of the outer portion of the cylindrical outer wail of the cap.

BRIEF DESCRIPTION OF THE DRAWING

Various embodiments of the invention will now be described with reference to the accompanying drawings in which.

DETAILED DESCRIPTION OF A PREFERRED EMBODIMENT

Figure 1:
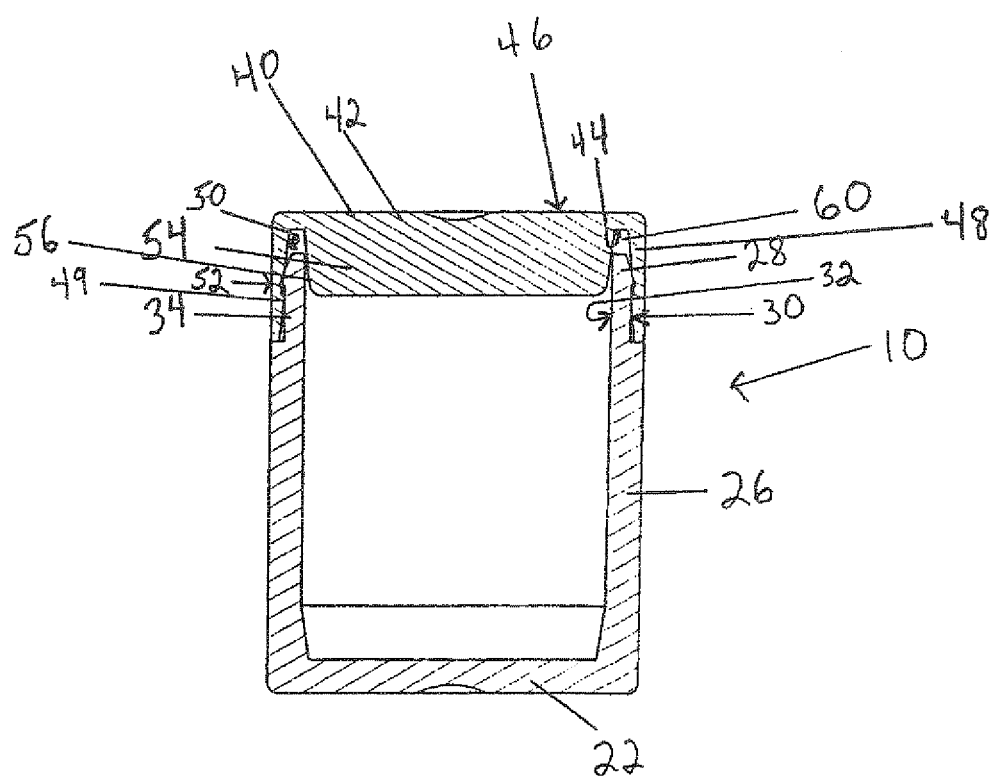
FIG. 1 is a cut away side view of the canister with the cap secured onto the body portion.

Although the invention is adaptable to a wide variety of uses and encompasses a significant number of embodiments, one embodiment of the invention is shown in the drawings for purposes of illustration. This embodiment discloses a canister (10). The canister can contain a variety of types of particulate or solid materials. In one preferred embodiment the material comprises particulate desiccant materials. In an alternative preferred embodiment, the material comprises particulate oxygen absorbing materials. In another embodiment the material comprises material which release gases, such as desirable odors or scents into the environment. Any other type of particulate or solid material, which can impact the environment in which the canister (10) is used, may be contained within the canister, particularly for the absorption or adsorption or desorption of gases by the material contained within the canister.

Figure 2:
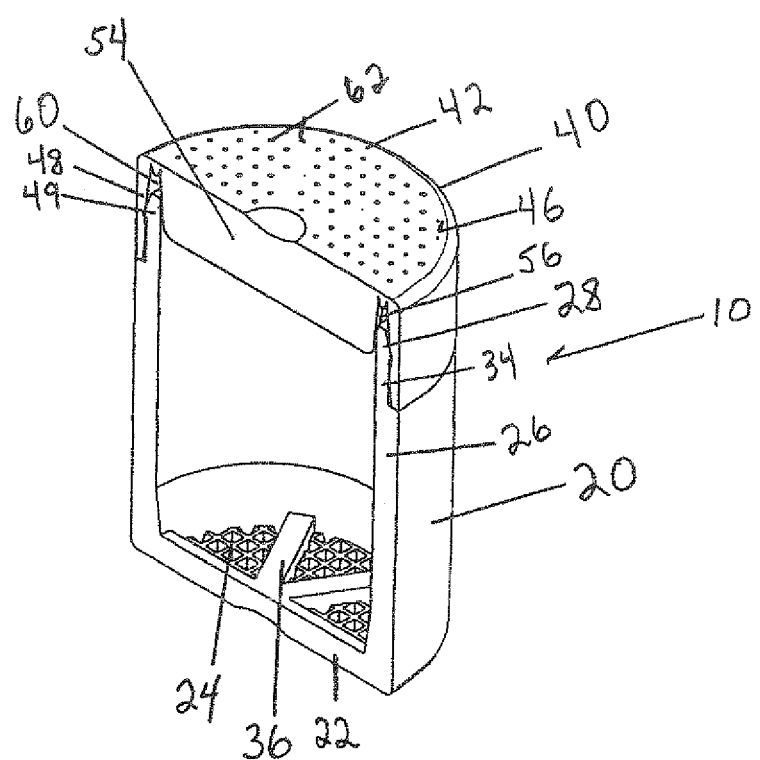
FIG. 2 is a cut away perspective view of the canister with the cap secured onto the body portion showing the relationship among the support element of the cap, the upper cylindrical edge portion of the body portion and the cylindrical outer wall of the cap.
Figure 4:
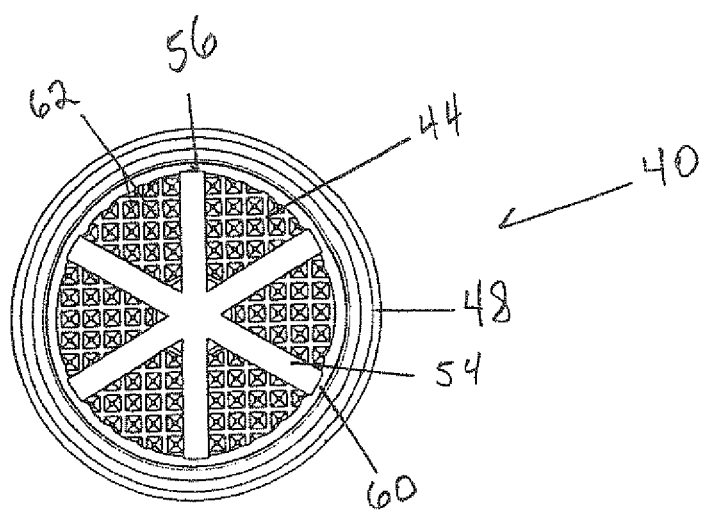
FIG. 4 is an inside end view of the inner surface of the cap of the canister.

The canister (10) comprises a body portion (20), a cap (40) and the particulate material (not shown) contained within the canister, as shown in FIGS. 1 and 2. At least one or both of the body portion (20) and cap (40) contain apertures (24, 62) which permit the passage of gases into and out of the canister (10) for absorption or adsorption or desorption by the particulate material (80), as shown in FIGS. 4 and 7.

The body portion (20) of the canister (10) is preferably formed from a gas impermeable, plastic material well known in the industry. In one embodiment, it is generally cylindrical in shape and may be open at only one or both ends. Alternatively, the overall shape of the canister can be any polygonal shape as desired by the manufacturer.

Figure 7:
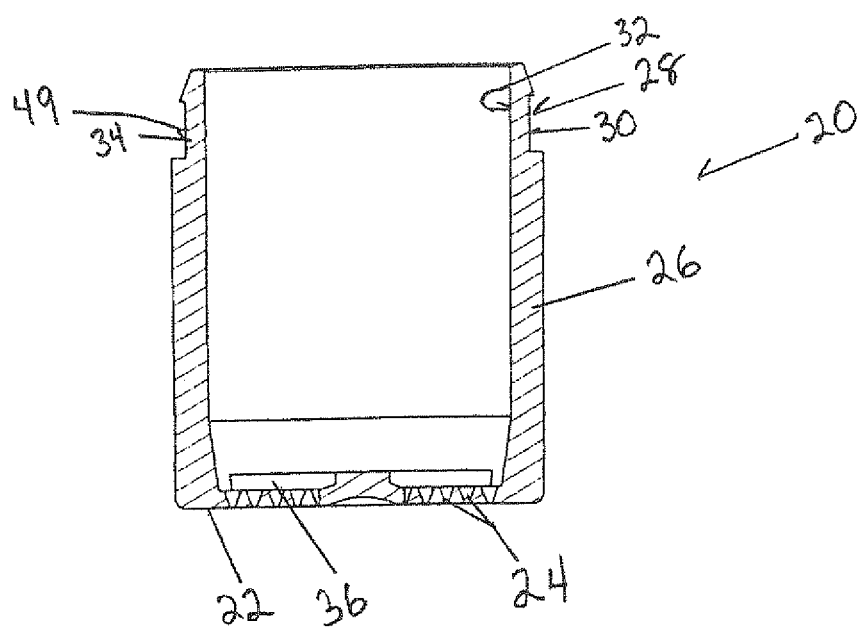
FIG. 7 is a cut away side view of the body portion of the canister.

In one preferred embodiment, as shown in FIG. 7, the body portion (20) includes a circular end wall (22), preferably with apertures (24) in that end wall (22). Extending away from the end wall (22) is a cylindrical side wall (26). The portion of the cylindrical side wall (26) furthest from the end wall (22), forming a ring around the cylindrical side wall (26), is an upper cylindrical edge portion (28) containing an outer surface (30) and an inner surface (32).

In one preferred embodiment, as shown in FIG. 7, a groove (34) is cut into the outer surface (30) of the upper cylindrical edge portion (28) of the cylindrical side wall (26). This groove (34) and its uses are discussed in more detail later in this disclosure.

To provide support for the end wall (22), reinforcing ribs (36) may form an integral portion of the end wall (22) of the body portion, as shown in FIG. 7. These reinforcing ribs (36) preferably comprise a solid plastic portion of the end wall (22). The particular shape and number of ribs (36) in the end wall (22) of the body portion (20) is a matter of choice. Any extension of the ribs (36) inward within the canister (10) away from the surface of the end wall (22) is not particularly necessary, as the support provided by the reinforcing ribs (36) is present primarily because of the existence of the solid rib structure within the overall structure of the end wall (22) extending from one location on the end wall (22) to another location on the end wall.

The second component of the canister (10) is the cap (40) which is secured upon the body portion (20) after the body portion (20) has been filled with the particulate material as shown in FIGS. 1 and 2. The cap (40) is also preferably formed from a gas impermeable, plastic material.

The cap (40) preferably comprises a circular top wall (42) with an inner surface (44) and an outer surface (46) and a cylindrical outer wall (48) extending away from the top wall (42), as shown in FIGS. 3, 4, 5 and 6. The outer diameter of the cylindrical outer wall (48) is the same, or preferably slightly smaller, than the outer diameter of the cylindrical side wall (26) of the body portion.

Figure 3:
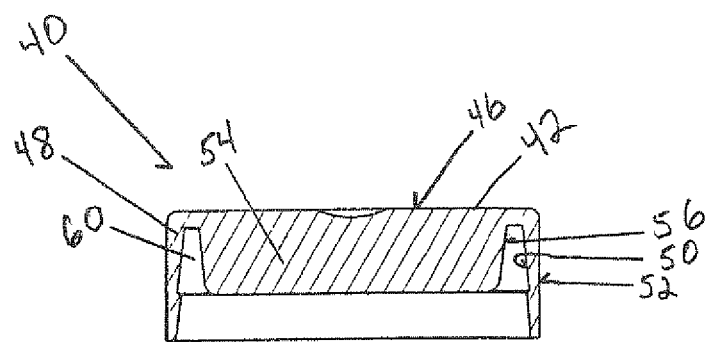
FIG. 3 is a cut away side view of the cap of the canister.
Figure 5:
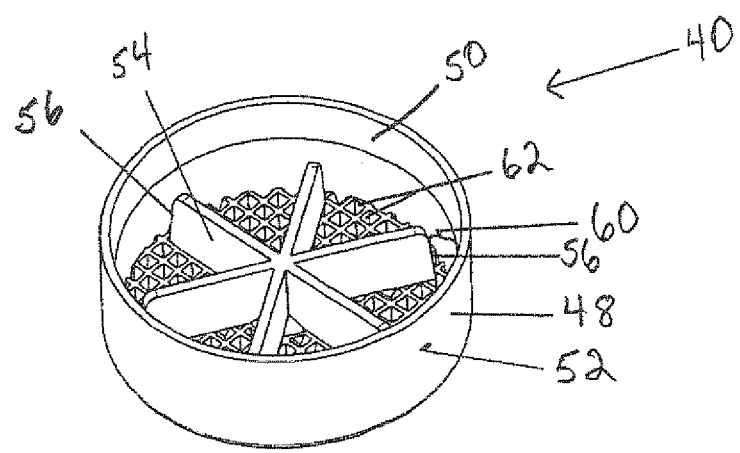
FIG. 5 is a perspective view of the inside of the cap of the canister showing the support elements.

The cylindrical outer wall (48) of the cap (40) contains an inner portion (50) and an outer portion (52) as shown in FIGS. 3 and 5.

An important element of one embodiment of the invention is a support element or elements (54) that are secured to the inner surface (44) of the top wall (42), as shown in FIGS. 3, 4 and 5. The support element or elements (54) extend away from the inner surface (44) of the top wall (42) into the inside of the canister when formed, at least about 1.5 mm, and preferably from about 2 mm to about 4 mm, though this distance is not critical. The support element or elements (54) are preferably formed perpendicular to the top wall (42).

The support element(s) (54), while secured to the inner surface (44) of the top wall (42), and preferably formed as an integral part thereof, do not contact the inner portion (50) of the cylindrical outer wall (48) of the cap (40), as shown in FIG. 3. Rather, gaps (60) are formed between each of the ends (56) of the support element(s) (54) and the surface of the inner portion (50) of the cylindrical outer wall (48) of the cap, as shown in FIGS. 3, 4 and 5. These gaps (60) are an important element of one embodiment of the canister (10) of the invention.

The size of the gaps (60) between the ends (56) of the support element (54) and the inner portion (50) of cylindrical outer wall (48) is approximately the thickness of the upper cylindrical edge portion (28) of the cylindrical side wall (26) extending upward from the end wall (22) of the body portion (20). Preferably, there is a reasonably tight fit when the upper cylindrical end portion (28) is secured within these gaps (60), when the cap (40) is secured upon the body portion (20), as shown in FIGS. 1 and 2. Preferably, the ends (56) of the support element (54) also exert horizontal pressure on the inner surface (32) of the upper cylindrical edge portion (28) of the body portion (20) when the cap (40) is secured onto the body portion (20).

When the cap (40) is secured onto the body portion (20) of the canister (10), this upper cylindrical edge portion (28) of the cylindrical side wall (26) of the body portion (20) is forced into these gaps (60) between the ends (56) of the support element (54) and the inner portion (50) of the cylindrical outer wall (48). Because of the height of the support element (54) and the fact that the width of the gap (60) between the ends (56) of the support element (54) and the inner portion (50) of the cylindrical outer wall (48) is carefully controlled, the cap (40) can not pop off of the body portion (20) of the canister (10) even when horizontal pressure is placed against the outside of the cylindrical side wall (26) of the body portion (20).

To assist in firmly securing the cap (40) onto the body portion (20), in a preferred embodiment, the groove (34) is present in the outer surface (30) of the upper cylindrical edge portion (28) of the cylindrical side wall (26) of the body portion (20). Operating in coordination with this groove (34) is a snap portion (49) of the upper cylindrical outer wall (48) of the cap (40), as shown in FIGS. 1 and 2. When the cap (40) is secured onto the body portion (20), the snap portion (49) of the upper cylindrical outer wall (48) fits within the groove (34) in the outer surface (30) of the upper cylindrical edge portion (28) of the cylindrical side wall (26) of the body portion. The interaction of the snap portion (49) with the groove (34) assists in securely holding the cap (40) onto the body portion (20). Further, because the support element(s) (54) prevent or restrict horizontal movement of the upper cylindrical edge portion (28) of the body portion (20) in relation to the cylindrical outer wall (48) of the cap (40), the security for retaining the cap (40) onto the body portion is enhanced. In addition, by this structure of the canister (10), when horizontal pressure is placed on the body portion (20) during the formation of the canister, there is a reduced risk of cap pop-off.

Figure 6:
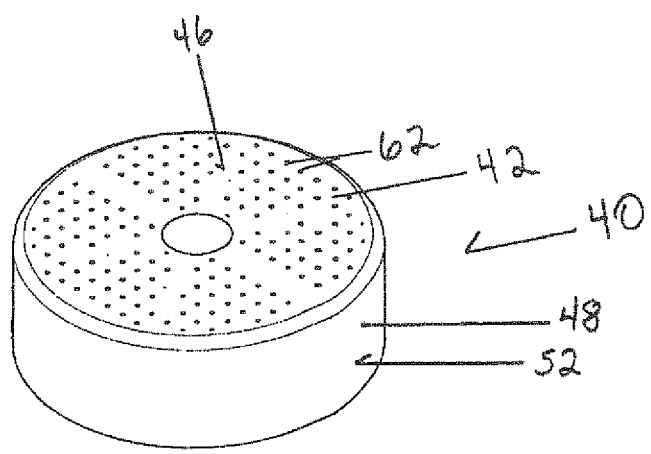
FIG. 6 is a perspective view of the outside of the cap.

The circular top wall (42) of the cap (40) preferably contains apertures (62), as shown in FIG. 6. The presence of the support elements (54) do not reduce substantially the absorption or adsorption capability of the particulate material contained within the canister (10) because of the minimal reduction of the number of apertures (62) present in the top wall (42). The number and size of the apertures (62) can be adjusted to enhance or restrict the absorption or adsorption or desorption capability of the material contained in the canister (10).

A label (not shown) is preferably secured to the cylindrical side wall (26) of the body portion (20), which preferably overlaps a portion of the cylindrical outer wail (48) of the cap (40), to further assist in securing the cap (40) to the body portion (20).

The process of production of the canister (10) begins with the formation of the body portion (20), which is open in at least one end. The body portion (20) may have any convenient shape including cylindrical or any polygonal shape. Preferably, apertures (24) are formed in the end wall (22) of the body portion (20) by conventional procedures. Further, preferably the end wall (22) of the body portion (20) is formed containing one or more supporting ribs (36). Following formation of the body portion (20), particulate or solid material is placed within the body portion (20), which material may be a desiccant material, an oxygen absorber an absorber for other types of gases or a desorber of scents or odors, as desired. The cap (40) is preferably formed at the same time as the body portion (20). The cap (40) includes the circular top wall (42) with an inner surface (44) and an outer surface (46) and a cylindrical outer wall (48) of the cap (40). A support element or elements (54) is secured to the inner surface (44) of the top wall providing a gap (60) between the ends (56) of the support element (54) and the surface of the inner portion (50) of the cylindrical outer wall (48). Following formation of the cap (40) and following filling the body portion (20) with the particulate material, the cap (40) is secured to the body portion (20) of the canister (10). During this securing process, the upper cylindrical edge portion (28) of the cylindrical side wall (26) of the body portion is pressed into the gap (60) that is formed between the ends (56) or the support element (54) and the inner portion (50) of the cylindrical outer wall (48). To assist in securing the cap (40) to the body portion, preferably the upper cylindrical outer wall (48) of the cap contains a snap portion (49) which operates in coordination with a groove (34) in the outer surface (30) of the upper cylindrical edge portion (28) of the cylindrical side wall (26) of the body portion (20), as shown in FIGS. 1 and 2. Following securing of the cap (40) onto the body portion (20) with the material contained therein, the canister (10) is ready for use.

It will thus be seen that the objects set forth above, among those made apparent from the preceding description, are efficiently obtained. Certain changes may be made to components of the articles without departing from the scope of the embodiment of the invention. It is intended that all matter contained in the above-description as shown in the accompanying drawings shall be interpreted as illustrative only of one embodiment of the invention and not place any limitation on the scope of the invention.

What is claimed:

1. A canister comprising
a body portion comprising an end wall and a side wall, wherein there is extending from the side wall an upper edge portion thereof, and
a cap securable to the body portion comprising a top wall with an inner surface and an outer surface and a cylindrical outer wall secured to the top wall comprising a cylindrical inner surface and an outer portion, wherein a plurality of elongated rib-like supporting elements are secured to the inner surface of the top wall which extend from near a first location on the cylindrical inner surface of the cylindrical outer wall to a second location also near the cylindrical inner surface of the cylindrical outer wall, thereby forming two discrete ends of the support element and also forming a gap between the cylindrical inner surface of the cylindrical outer wall of the cap and each end of the support elements,
whereby at least a portion of the upper edge portion of the side wall of the body portion is secured within the gap between the cylindrical inner surface of the cylindrical outer wall of the cap and each end of the support elements forming a fit when the cap is secured onto the body portion of the canister, the ends of the support elements exerting horizontal pressure on an cylindrical inner surface of the upper edge portion of the side wall,
whereby the support elements extend substantially perpendicular to the respective portion of the cylindrical inner surface of the cyclindrical outer wall, and
wherein one or both of the body portion and cap contains apertures which permit the passage of gases into and out of the canister.

2. The canister of claim 1 wherein the body portion and the cap are generally cylindrical in shape.

3. The canister of claim 1, wherein the outer wall further comprises a snap portion extending inwardly.

4. The canister of claim 3, wherein the upper edge portion of the side wall of the body portion further comprises a groove.

5. The canister of claim 4, wherein the cap is secured to the body portion, the snap portion of the outer wall interacts with the groove in the cylindrical wall of the body portion.

6. The canister of claim 1 further comprising a label secured to the wall of the body portion and also to a portion of the upper edge portion of the body portion.

7. The canister of claim 1 wherein the discrete ends of the support elements extend away from the inner surface of the top wall of the cap.

8. The canister of claim 1 wherein the discrete ends of the support elements extend away from the inner surface of the top wall of the cap at least about 1.5 mm.

* * * * *